Patented May 29, 1951

2,554,791

UNITED STATES PATENT OFFICE 2,554,791

PRESSURE ADHESIVE TAPE AND SHEET

Mortimer H. Nickerson, Springfield, Mass., assignor, by mesne assignments, to Donald B. Alexander, Henry T. Chamberlain, John F. Mannion, Walter A. Wade, Edgar R. Bourke, Ernest W. Schneider, and Charles S. Vrtis, as trustees of The Arthur J. Schmitt Foundation, Lemont, Ill., a charitable trust No Drawing. Application November 20, 1948,
Serial No. 61,299

9 Claims. (Cl. 117—122)

This invention relates to an improved adhesive sheet, more particularly to sheets in tape form which may be prepared and sold in the form of rolls, one face of the tape being provided with a coating of pressure sensitive adhesive.

Tapes of this kind are commonly made of sheets, or strips of fabric, paper or regenerated cellulose, coated with a tacky composition of latex or reclaimed rubber with a gum or resin.

One of the difficulties encountered in the manufacture of such tapes is the tendency of the adhesive coating to peel or "offset" from the tape backing material when the tape is wound in roll form. This tendency results from various causes arising from the character of the backing strip, the adhesive used, and the nature of the plasticizers and solvents used in preparing the various elements of the tape and adhesive, and the relative adhesive and cohesive characteristics of the adhesive material.

One object of the present invention is to provide a pressure adhesive tape having improved toughness and electrical insulating characteristics, and possessing adhesive and non-offsetting properties adequate for the difficult conditions under which such a tape is used.

Other and further objects will be apparent from the following specification and claims.

I have found that a plasticized polyvinyl chloride sheeting possesses the strength and elastic qualities needed for my purposes as a backing material particularly and preferably when properly stretch oriented. A satisfactory degree and character of orientation is provided by heating and stretching the sheet or film and holding it until cool. The degree of elongation imparted to the sheet may be 100% or higher.

The adhesive material may be a conventional water dispersion of reclaimed rubber, 30% solids, with or without some natural rubber, which is available under various trade names.

The use of a plasticized polyvinyl chloride backing involves certain problems such as the tendency to migration of the plasticizers present in the backing or used in connection with the adhesive materials. These and other problems arising from the use of the polyvinyl chloride backing are overcome by the specific materials and formulating steps shortly to be pointed out.

Polyvinyl chloride is most commonly plasticized with ester type plasticizers. By their chemical nature good plasticizers have good solvent action and compatibility with a wide variety of resinous materials. Since these plasticizers are generally liquids, they also possess mobility even when dissolved in or compounded with a suitable resin. This mobility accounts for the observed tendency of plasticizer to migrate from one solid phase to another where both phases are compatible with the plasticizer and are in close contact. In this case it was observed that the common liquid ester type plasticizers were compatible not only with the polyvinyl chloride backing sheet but also with the rubber composition used as the pressure-sensitive adhesive layer. Migration of the plasticizer into the adhesive layer caused an observable softening and loss of cohesiveness with a consequent weakening of the adhesive bond. The same would be true with copolymers of vinyl chloride and vinyl acetate, polyvinyl butyral, or cellulose acetate and similar materials.

A very necessary function of the adhesive layer in any so-called strippable tape is that while it must stick firmly and well to any surface on which it is pressed it must stick even more firmly to its own backing layer, in this case plasticized polyvinyl chloride. It was found that if an aqueous dispersion of reclaimed rubber were applied directly to a polyvinyl chloride sheet and dried thereon that the adhesion to the plasticized polyvinyl chloride was no greater than the adhesion to other surfaces on which the tape might be pressed. As a result, stripping of the tape resulted in offset, i. e., transfer of some of the adhesive layer from the plasticized polyvinyl chloride backing to the surface on which the tape had been pressed.

I have found that the two effects described in the above paragraphs can be eliminated by first prime-coating the polyvinyl chloride with polybutene B-100. This material, polybutene B-100, is a polymer of isobutylene having an average molecular weight of about 100,000. The average molecular weight for my purposes may vary between 60,000 (B-60) and 120,000 (B-120) but the B-100 is preferable and commercially available. It is most conveniently applied as a 10% solution in toluene or equivalent hydrocarbon solvent and may be applied by spraying or in any other suitable manner. This primer coating provides a surface to which the reclaimed rubber has a natural adhesion and also provides a barrier to the migration of the ester plasticizer into the adhesive layer. The primer coating may of course contain other materials than polyisobutylene and the latter will continue to exert its effect generally in proportion to the percentage in which it is present.

The polybutene primer coating is allowed to dry and a coating of the reclaimed rubber dispersion is then applied. For best results two coats of the reclaimed rubber dispersion are applied, the first coat being allowed to dry before the second is applied.

After drying of the second adhesive coat the sheets, usually slit into tapes of various widths, may be rolled up on themselves to a convenient size for handling. The result of the above combinations of materials and processes is a strong flexible tape ready for instant use on unwinding from its roll and adhering strongly to dry surfaces.

Polyvinyl chloride may be suitably plasticized by mechanically blending it with an equal weight of a copolymer of butadiene and acrylonitrile. The acrylonitrile content of the copolymer may vary between 18-35%. Polyvinyl chloride plasticized in this way has certain advantages because of the resinous character of the plasticizer which effectively reduces any tendency towards migration. This backing is prime coated as above described. After drying of the primer coat an adhesive coating is applied which comprises a 25% solution of equal parts by weight of polybutene B-100 polybutene B-12 and an ester of a hydrogenated rosin acid, the latter increasing the cohesiveness. Polybutene B-12 is a polymer of isobutylene having an average molecular weight of about 12,000. A satisfactory rosin acid ester is commercially available as "Staybelite Ester 10." The addition of the B-12 gives increased adhesive qualities over the B-100 alone and the normally expected decrease in cohesiveness is obviated by the addition of the rosin acid ester. These materials are dissolved in an aromatic solvent such as toluene with a boiling point of about 111° C., or a combination of aromatic and aliphatic solvents in which the polybutenes are soluble and which are commonly available under various trade names, "Rubbersol" being an example.

In the last described combination the primer coat serves to bond the pressure sensitive adhesive coat and the backing sheet. Since the plasticizers in both the backing sheet and the adhesive coating are in this case resinous there is no tendency toward migration.

This last described combination has the advantage that the butadiene-acrylonitrile copolymer is exceptionally oil resistant and this resistance is retained in the polyvinyl chloride. The result is a strong tough pressure sensitive tape with excellent electrical properties and a superior resistance to oils and chemicals.

What I claim is:

1. A pressure sensitive adhesive tape comprising a backing strip of plasticized polyvinyl chloride, said strip being coated on one side with a polymer of isobutylene having an average molecular weight of not substantially less than 60,000 and not substantially greater than 120,000, and having a coating of pressure sensitive adhesive superposed on said first-named coating, said adhesive comprising mainly a water dispersion of reclaimed rubber, 30% solids, the first-named coating providing a non-offsetting bond between the backing strip and the adhesive coating and preventing the migration of migratory plasticizers from the backing into the adhesive.

2. A pressure sensitive adhesive tape comprising a backing strip of plasticized stretch oriented polyvinyl chloride, said strip being coated on one side with a polymer of isobutylene having an average molecular weight of not substantially less than 60,000 and not substantially greater than 120,000, and having a coating of pressure sensitive adhesive superposed on said first-named coating, said adhesive comprising mainly a water dispersion of reclaimed rubber, 30% solids, the first-named coating providing a non-offsetting bond between the backing strip and the adhesive coating and preventing the migration of migratory plasticizers from the backing into the adhesive.

3. A pressure sensitive adhesive tape comprising a backing strip of plasticized, polyvinyl chloride, said strip being coated on one side with a solution of a polymer of isobutylene having an average molecular weight of approximately 100,000 in an aromatic solvent, and having a coating of a rubber-type pressure sensitive adhesive superposed on said first-named coating, said adhesive comprising mainly a water dispersion of reclaimed rubber, 30% solids, the first-named coating providing a non-offsetting bond between the backing strip and the adhesive coating and preventing the migration of migratory plasticizers from the backing into the adhesive.

4. A pressure sensitive adhesive tape comprising a backing strip of stretch oriented, plasticized polyvinyl chloride, said strip being coated on one side with a solution of a polymer of isobutylene having an average molecular weight of approximately 100,000 in an aromatic solvent, and having a coating of a rubber-type pressure sensitive adhesive superposed on said first-named coating, said adhesive comprising mainly a water dispersion of reclaimed rubber, 30% solids, the first-named coating providing a non-offsetting bond between the backing strip and the adhesive coating and preventing the migration of migratory plasticizers from the backing into the adhesive.

5. A pressure sensitive adhesive tape comprising a backing strip of stretch oriented ester plasticized polyvinyl chloride, said strip being coated on one side with a solution of a polymer of isobutylene having an average molecular weight of approximately 100,000 in an aromatic solvent, and having a coating of a rubber-type pressure sensitive adhesive superposed on said first-named coating, said adhesive comprising mainly a water dispersion of reclaimed rubber, 30% solids, the first-named coating providing a non-offsetting bond between the backing strip and the adhesive coating and preventing the migration of migratory plasticizers from the backing into the adhesive.

6. A pressure sensitive adhesive tape comprising a backing strip of polyvinyl chloride plasticized with a copolymer of butadiene and acrylonitrile provided on one side with a coating consisting of a solution of a polymer of isobutylene having an average molecular weight of approximately 100,000 and having a coating of pressure sensitive adhesive superposed on said first-named coating, the latter providing a non-offsetting bond between the adhesive and the backing strip, said pressure sensitive adhesive comprising substantially equal parts of a polymer of isobutylene having an average molecular weight of approximately 100,000, a polymer of isobutylene having an average molecular weight of approximately 12,000 and an ester of hydrogenated rosin acid.

7. A pressure sensitive adhesive tape comprising a backing strip of stretch oriented polyvinyl chloride plasticized with a copolymer of butadiene and acrylonitrile provided on one side with a coating consisting of a solution of a polymer of isobutylene having an average molecular weight of approximately 100,000 and having a coating of pressure sensitive adhesive superposed on said first-named coating, the latter providing a non-offsetting bond between the adhesive and the backing strip, said pressure sensitive adhesive comprising substantially equal parts of a polymer of isobutylene having an average molecular weight of approximately 100,000, a polymer of isobutylene having an average molecular weight of approximately 12,000 and an ester of hydrogenated rosin acid.

8. A pressure sensitive adhesive tape comprising a backing strip of polyvinyl chloride plasticized with a copolymer of butadiene and acrylonitrile, the acrylonitrile content of the copolymer comprising from 18% to 35% thereof, said backing strip being coated on one side with a toluene solution of a polymer of isobutylene having an average molecular weight of approximately 100,000, and having a coating of pressure sensitive adhesive superposed on said first-named coating, the latter providing a non-offsetting bond between the adhesive and the backing strip, said pressure sensitive adhesive comprising substantially equal parts of a polymer of isobutylene having an average molecular weight of approximately 100,000 and a polymer of isobutylene having an average molecular weight of approximately 12,000.

9. A pressure sensitive adhesive tape comprising a backing strip of stretch oriented polyvinyl chloride plasticized with a copolymer of butadiene and acrylonitrile, the acrylonitrile content of the copolymer comprising from 18% to 35% thereof, said backing strip being coated on one side with a toluene solution of a polymer of isobutylene having an average molecular weight of approximately 100,000, and having a coating of pressure sensitive adhesive superposed on said first-named coating, the latter providing a non-offsetting bond between the adhesive and the backing strip, said pressure sensitive adhesive comprising substantially equal parts of a polymer of isobutylene having an average molecular weight of approximately 100,000, a polymer of isobutylene having an average molecular weight of approximately 12,000, and an ester of a rosin acid dissolved in an aromatic solvent.

MORTIMER H. NICKERSON.

REFERENCES CITED

The following references are of record in the file of this patent:

UNITED STATES PATENTS

| Number | Name | Date |
|---|---|---|
| 2,319,959 | Tierney | May 25, 1943 |
| 2,332,265 | Schmidt | Oct. 19, 1943 |
| 2,439,481 | Martin | Apr. 13, 1948 |
| 2,442,279 | Alderfer | May 25, 1948 |